United States Patent
Fruth et al.

(10) Patent No.: US 9,853,940 B2
(45) Date of Patent: Dec. 26, 2017

(54) PASSIVE WEB APPLICATION FIREWALL

(71) Applicant: Microsoft Technology Licensing, LLC, Redmond, WA (US)

(72) Inventors: Robert C. Fruth, Seattle, WA (US); Viresh Ramdatmisier, Seattle, WA (US); Barry Markey, Kirkland, WA (US); Robert Fish, Seattle, WA (US); Erik Tayler, Seattle, WA (US); Dragos Boia, Seattle, WA (US); Donald Ankney, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 14/864,858

(22) Filed: Sep. 24, 2015

(65) Prior Publication Data

US 2017/0093795 A1   Mar. 30, 2017

(51) Int. Cl.
*H04L 29/06* (2006.01)
(52) U.S. Cl.
CPC .......... *H04L 63/02* (2013.01); *H04L 63/1425* (2013.01); *H04L 63/1433* (2013.01); *H04L 63/1441* (2013.01)
(58) Field of Classification Search
CPC .......................... H04L 63/04; H04L 63/1425
(Continued)

(56) References Cited

U.S. PATENT DOCUMENTS 7,574,740 B1   8/2009   Kennis
8,601,586 B1   12/2013  Boutros et al.
(Continued)

FOREIGN PATENT DOCUMENTS

WO   2014054854 A1   4/2014

OTHER PUBLICATIONS

"International Search Report and Written Opinion Issued in PCT Application No. PCT/US2016/052360", dated Nov. 17, 2016, 11 Pages.
(Continued)

*Primary Examiner* — Longbit Chai
(74) *Attorney, Agent, or Firm* — The Watson IP Group, PLC; Vladan M. Vasiljevic

(57) ABSTRACT

To protect network-based services, offering computer implemented functionality, from attacks, a passive web application firewall reactively identifies vulnerabilities, enabling such vulnerabilities to be quickly ameliorated, without intercepting communications or introducing other suboptimal aspects of traditional web application firewalls. Communications directed to the network-based services are logged and such logs are scanned for entries evidencing attacks, such as based on predetermined attack syntax. Further evaluation of the entries identified as evidencing attacks identifies a subset of those entries that correspond to likely successful attacks. Such further evaluation includes attacking the network-based service in an equivalent manner. Attacks that are found to be successful identify vulnerabilities, and a notification of such vulnerabilities is provided to facilitate amelioration of such vulnerabilities. Vulnerability amelioration can be automatic, such as by automatically adjusting the settings corresponding to the implementation of the network-based services to ameliorate identified vulnerabilities in a predetermined manner.

20 Claims, 4 Drawing Sheets

(58) Field of Classification Search
USPC .......................................................... 726/11
See application file for complete search history.

(56) References Cited

U.S. PATENT DOCUMENTS

| | | |
|---|---|---|
| 8,856,869 B1 | 10/2014 | Brinskelle |
| 2004/0073800 A1 | 4/2004 | Shah et al. |
| 2006/0253906 A1 | 11/2006 | Rubin et al. |
| 2008/0244742 A1 | 10/2008 | Neystadt et al. |
| 2010/0306847 A1 | 12/2010 | Lambert et al. |
| 2011/0185055 A1 | 7/2011 | Nappier et al. |
| 2012/0005206 A1 | 1/2012 | Anagnostakis et al. |
| 2012/0304244 A1 | 11/2012 | Xie et al. |
| 2013/0031635 A1 | 1/2013 | Lotem et al. |
| 2013/0191920 A1 | 7/2013 | Amit et al. |
| 2014/0259173 A1 | 9/2014 | Parcel |
| 2016/0285861 A1* | 9/2016 | Chester ..................... H04L 9/14 |

OTHER PUBLICATIONS

Abad, et al., "Log Correlation for Intrusion Detection: A Proof of Concept", In Proceedings of 19th Annual Computer Security Applications Conference, Dec. 8, 2003, 10 pages.

Kim, et al., "Efficient Patch-Based Auditing for Web Application Vulnerabilities", In Proceedings of the 10th USENIX conference on Operating Systems Design and Implementation, Oct. 8, 2012, 14 pages.

"ModSecurity", Published on: Jun. 23, 2014 Available at: https://www.modsecurity.org/about.html.

Shackleford, Dave., "Real-Time Adaptive Security", In SANS Whitepaper, Dec. 2008, 15 pages.

Makiou, et al., Improving Web Application Firewalls to Detect Advanced SQL Injection Attacks, In Proceedings of 10th International Conference on Information Assurance and Security, Nov. 2014, pp. 35-40.

"Web Application Security", Published on: Apr. 29, 2013 Available at: https://www.imperva.com/docs/DS_Web_Security.pdf.

Meyer, Roger, "Detecting Attacks on Web Applications from Log Files", In White Paper, Aug. 8, 2013, 46 pages.

"Second Written Opinion Issued in PCT Application No. PCT/US2016/052360", dated Aug. 3, 2017, 5 pages.

* cited by examiner

PASSIVE WEB APPLICATION FIREWALL

BACKGROUND

Modern computer networking hardware enables physically separate computing devices to communicate with one another orders of magnitude faster than was possible with prior generations of networking hardware. Consequently, it has become more practical to perform digital data processing at locations remote from the user requesting such processing, or on whose behalf such processing is being performed. Network-based services can provide users with access to computer-implemented functionality over a network without requiring that the user install software for performing such functionality locally on the user's computing device, thereby saving the user financial resources that would otherwise have been expended in purchasing such software, as well as the computing resources of storing and executing such software. Instead, users can simply access such network-based services when they desire to avail themselves of the computer-implemented functionality offered by such services. The popularity of network-based services also increases their profile as targets for attacks or other like malicious actions.

SUMMARY

To protect network-based services, offering computer implemented functionality, from attacks, a passive web application firewall can reactively identify vulnerabilities, enabling such vulnerabilities to be quickly ameliorated, without intercepting communications or introducing other suboptimal aspects of traditional web application firewalls. Communications directed to the network-based services can be logged and such logged communications can be scanned for entries evidencing attacks, such as based on predetermined attack signatures, patterns, or other syntactical aspects. Further evaluation of the entries identified as evidencing attacks can be performed to identify a subset of those entries that identify likely successful attacks. Such further evaluation can include attacking the network-based service in an equivalent manner to that evidenced by the unified entries. Attacks that are found to be successful can identify vulnerabilities, and a notification of such vulnerabilities can be provided to facilitate amelioration of such vulnerabilities, thereby increasing the security of such network-based services. Vulnerability amelioration can be automatic, such as by automatically adjusting the settings corresponding to the implementation of the network-based services to ameliorate identified vulnerabilities in a predetermined manner.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
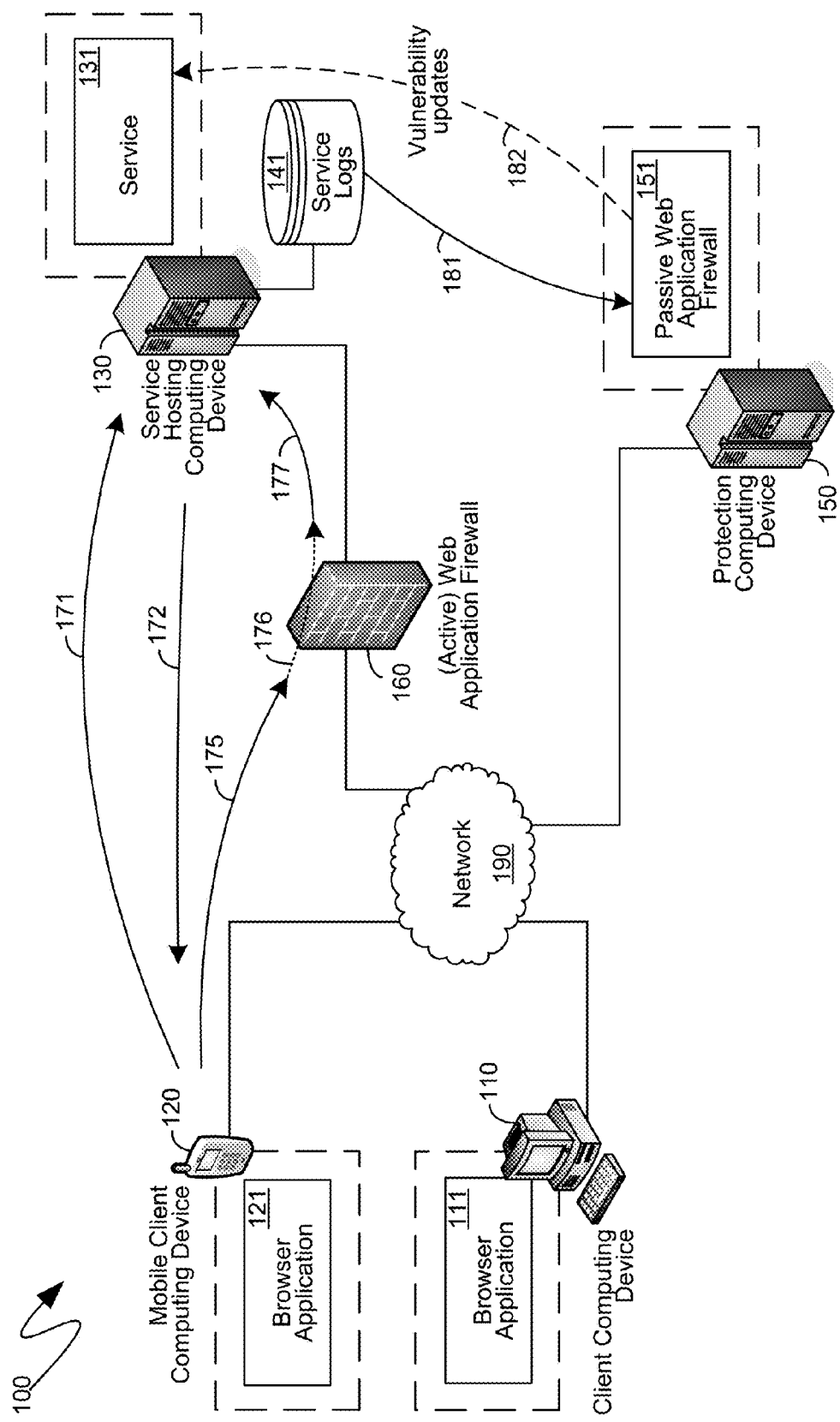
FIG. 1 is a block diagram of an exemplary system that includes a passive web application firewall.

The following description relates to protecting, from attacks, services that offer computer-implemented functionality to users through network communications. A passive web application firewall can reactively identify vulnerabilities, enabling such vulnerabilities to be quickly ameliorated, without intercepting communications or introducing other suboptimal aspects of traditional web application firewalls. Communications directed to the network-based services can be logged and such logged communications can be scanned for entries evidencing attacks, such as based on predetermined attack signatures, patterns, or other syntactical aspects. Further evaluation of the entries identified as evidencing attacks can be performed to identify a subset of those entries that identify likely successful attacks. Such further evaluation can include attacking the network-based service in an equivalent manner to that evidenced by the unified entries. Attacks that are found to be successful can identify vulnerabilities, and a notification of such vulnerabilities can be provided to facilitate amelioration of such vulnerabilities, thereby increasing the security of such network-based services. Vulnerability amelioration can be automatic, such as by automatically adjusting the settings corresponding to the implementation of the network-based services to ameliorate identified vulnerabilities in a predetermined manner.

The techniques described herein make reference to services that offer computer implemented-functionality over a network. As utilized herein, the term "computer-implemented functionality" means the execution of computer-executable instructions on one or more host computing devices that receive communications, from a remote client, requesting the performance of one or more functions and providing one or more constraints, such as parameters, variables and the like, that delineate the requested functions, and, in response, the execution of the computer-executable instructions performs the requested functions and generates results that are returned to such a remote client through communications directed thereto. Consequently, the term "computer-implemented functionality" includes the provision of search functionality, mapping functionality, content creation functionality, email functionality, personal information management functionality, and other like functionality. Additionally, references herein to the "Internet", "Web" or "World Wide Web", and "webpages" or "websites" are meant to be exemplary only and are not intended as an explicit limitation of the described mechanisms to only in embodiments utilizing the HyperText Transfer Protocol (HTTP) and the HyperText Markup Language (HTML). To the contrary, the mechanisms described herein are equally utilizable with any network infrastructure, communicational protocols, and interfaces.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 is shown as comprising a traditional desktop client computing device 110, and a mobile client computing device 120 that are both communicationally coupled to a network 190. The network 190 also has, communicationally coupled to it, computing devices hosting a service that provides computer-implemented functionality to clients over the network 190. While services, such as the exemplary service 131 are often executed across multiple computing devices operating in parallel or as a single cohesive computing unit, in a manner well known to those skilled in the art, for simplicity the exemplary system 100 of FIG. 1 shows only a single service hosting computing device 130 that illustratively represents such one or more devices.

Users can access the computer-implemented functionality, offered by the service 131, through communications established between the computer-executable instructions that implement the service 131 and computer-executable instructions being executed on computing devices utilized by such users, such as the exemplary browser application 111, being executed on the desktop client computing device 110, or the exemplary browser application 121, being executed by the mobile client computing device 120. For example, and as illustrated in FIG. 1, a user utilizing the browser application 121, executing on the mobile client computing device 120, can communicate requests, such as are exemplarily illustrated by the communication 171, to the service 131 executing on the exemplary service hosting computing device 130. In response, the computer-executable instructions comprising the service 131 can perform the requested operations and can return to the user responsive communication 172, thereby enabling the user to remotely access the computer-implemented functionality being offered by the service 131.

As indicated previously, the service 131 can be the target of malicious activity in the form of attacks directed to the service 131 that seek to either damage the ability of the service 131 to provide to the computer-implemented functionality, or that seek to access information, through the service 131, to which access would otherwise not be allowed. One mechanism that can provide some protection against such attacks can be an active web application firewall, such as exemplary active web application firewall 160. As will be recognized by those skilled in the art, an active web application firewall, such as exemplary active web application firewall 160, can intercept communications directed to the service 131, such as the exemplary communications 175, and can scan such communications for maliciousness in order to preemptively detect an attack prior to such communications being passed along to the service 131. More specifically, communications 175, originally directed to the service 131, or, more specifically, directed to a specific endpoint within the service 131, such as a specific service hosting computing device, can be intercepted by the active web application firewall 160, and can be compared with known, or predetermined, attack signatures, patterns, or other syntactical aspects. If the active web application firewall 160 determines that the communications 175 are an attack, they can be terminated at the active web application firewall 160, and never reach the service 131. Conversely, if the active web application firewall 160 determines that the communications 175 are not an attack, they can be passed through the active web application firewall 160, as illustrated by the dashed lines 176, and then allowed to proceed to the specific endpoint within the service 131 to which they were originally directed, as illustrated by the communications 177.

As will be recognized by those skilled in the art, active web application firewalls have disadvantages in the manner in which they protect the service 131 from attacks. For example, the active web application firewall 160 can only stop an attack if the attack has a syntax equivalent to already known attacks. As another example, the active web application firewall 160 can violate other security provisions, such as the requirement that secure communications be terminated only at a specific endpoint within the service 131, such as a specific computing device, and not at an intermediate endpoint, such as the active web application firewall 160. Consequently, there can be many situations in which an active web application firewall, such as the exemplary web application firewall 160, is undesirable or insufficient to adequately protect the service 131.

Accordingly, in one aspect, the service 131 can be protected by a passive web application firewall, such as exemplary passive web application firewall 151. For purposes of illustration, the exemplary passive web application firewall 151 shown is executing on a protection computing device 150. However, as will be recognized by those skilled in the art, a passive web application firewall can execute across multiple computing devices operating in parallel or otherwise as a cluster of computing devices acting as a cohesive computing unit, and the protection computing device 150 is meant to be illustrative of any one or more such computing devices. Unlike the active web application firewall 160, the exemplary passive web application firewall 151 can allow communications with the service 131 without interrupting such communications and without acting prior to such communications being received by the service 131. Thus, communications, such as the exemplary communication 171 can be directed to a specific endpoint within the service 131, such as a specific computing device, and can, actually, terminate at such a specific endpoint, thereby fulfilling any security requirements that require a specific termination endpoint for the communications 171. Instead of intercepting communications, the passive web application firewall 151 can utilize records generated by the service 131, which can generate records of the communications that it has received in the form of logs, such as exemplary service logs 141. For example, upon receiving communications, such as the exemplary communication 171, the service 131 can log such a communication in the exemplary service logs 141. To conserve space, only certain information from the communication 171 can be logged in the service logs 141, though, alternatively, the entire communication 171 can be stored is a log entry in the service logs 141.

The passive web application firewall 151 can then access the service logs 141, as illustrated by the arrow 181, and, in a manner which will be described in further detail below, can identify communications, previously received by the service 131, that are determined to have been attacks. From among those attacks, the passive web application firewall 151 can, in a manner that will be described in further detail below, identify those attacks that exploit actual vulnerabilities, or, stated differently, those attacks that are likely to succeed. Once such attacks that are likely to succeed are identified, the passive web application firewall 151 can provide notification of the vulnerabilities targeted by such attacks and such information can be utilized, either by automated mechanisms, through manual adjustments, or combinations thereof, to update or modify the service 131 so as to ameliorate the identified vulnerabilities, as graphically represented by the dashed arrow 182.

Figure 2:
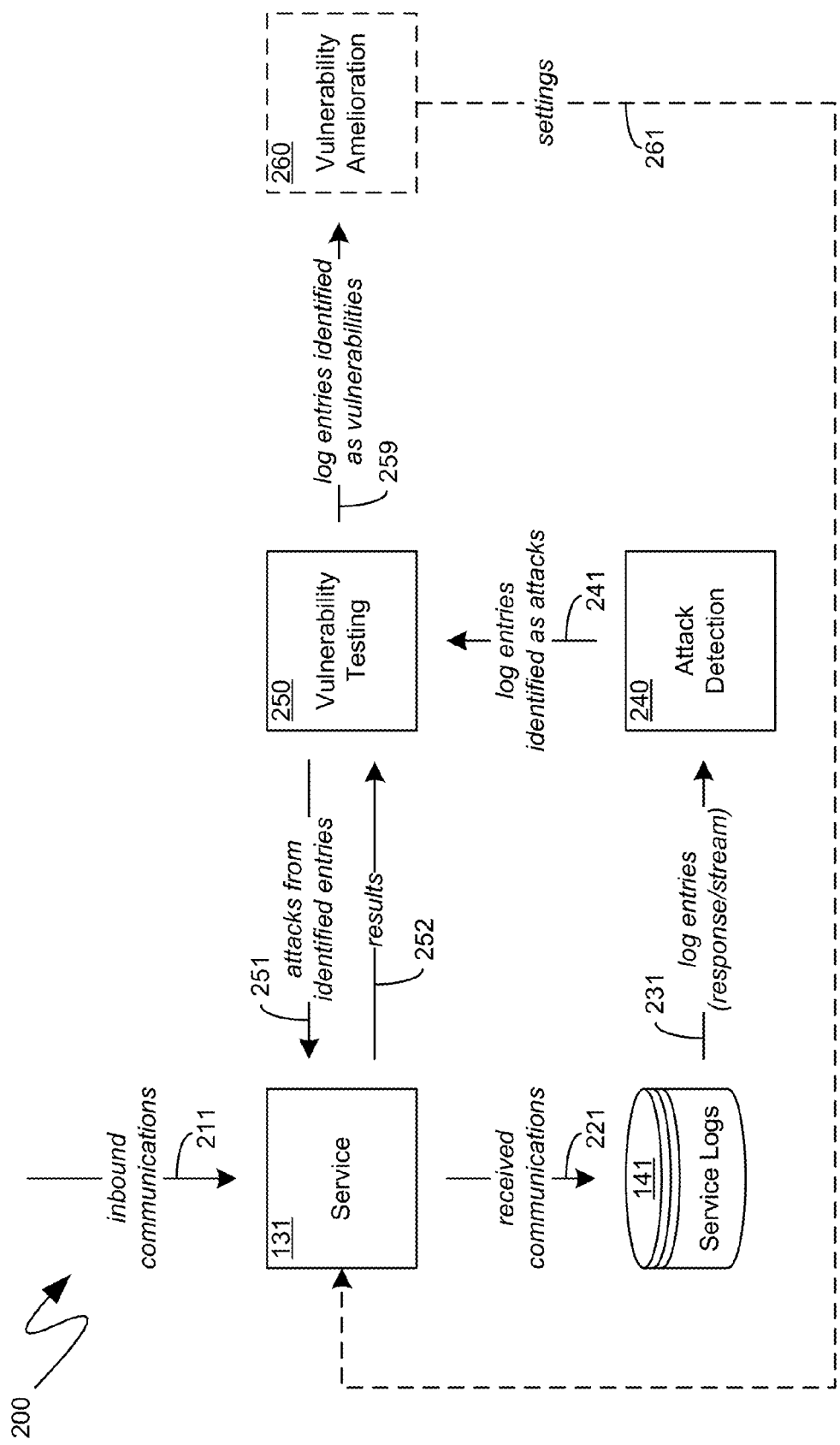
FIG. 2 is a block diagram of exemplary components of a passive web application firewall.

Turning to FIG. 2, exemplary system 200 shown therein illustrates exemplary components and operations of a passive web application firewall, such as exemplary passive web application firewall 151 that was illustrated in FIG. 1 and referenced above. More specifically, and as illustrated by the exemplary system 200 of FIG. 2, a service, such as exemplary service 131, providing users with computer-implemented functionality, can receive inbound communications, such as exemplary inbound communications 211, by which users can access such a service 131. In addition to performing requested operations and, thereby, providing users with access to the computer-implemented functionality provided by the service 131, the service 131, or components executing together therewith can log the received communications 211 as part of the service logs 141, in the form of logged received communications 221.

According to one aspect, an attack detection component, such as exemplary attack detection component 240, can obtain, such as from the exemplary service logs 141, log entries corresponding to the inbound communications 211. The obtaining of such log entries, graphically represented by the arrow 231, by the attack detection component 240 can be through explicit request/response paradigms, whereby the attack detection component 240 issues an explicit request for log entries from the service logs 141, and receives, in response thereto, the log entries requested. Alternatively, or in addition, the attack detection component 240 can receive entries from the service logs 141 in a streamed manner such that the entries are provided, to the attack detection components 240, contemporaneously with their storage in the service logs 141.

An attack detection component, such as exemplary attack detection component 240, can evaluate the received log entries, representing the inbound communications 211 that have been received by the service 131, to identify those of the inbound communications 211 that are deemed to be attacks, or communications of a malicious nature or intent. According to one aspect, the attack detection component 240 can compare the logged communications to predetermined attack syntaxes, including predetermined attack signatures, predetermined attack patterns, and other like predetermined attack syntax. Such an operation can be performed in a manner analogous to that utilized by conventional active web application firewalls. More specifically, each log entry can be compared against a list or other like collection of known attack syntax to determine correspondence between log entry and any attack syntax in the collection. A log entry indicative of inbound communications matching one or more known attack syntax can be identified as an attack by the exemplary attack detection component 240.

Various different forms of attacks can be detected by the exemplary attack detection component 240. For example, cross site scripting attacks can be detected by searching for predetermined expressions or types of expressions commonly utilized in cross site scripting attacks. As another example, code injection attacks can be detected by searching for the hexadecimal equivalent of the single quote character, the double-dash character, or other like characters predetermined to be part of a code injection attack. As yet another example, malicious file execution attacks can be detected by searching for various protocol specifiers, identification of remote computing devices, and other like attack syntax. Cross site forgery attacks, indirect object reference attacks, improper authentication and session management attacks, improper error handling attacks, and other like attacks can be detected by the attack detection component 240 in an analogous manner.

Log entries identified as attacks by the exemplary attack detection component 240 can, according to one aspect, be provided to a subsequent component that can evaluate whether such identified attacks are likely to be successful and can, thereby, test the vulnerability of the service 131 to such attacks. The exemplary system 200 of FIG. 2 illustrates such a vulnerability testing component in the form of the exemplary vulnerability testing component 250, which can receive the log entries identified as attacks 241 from the exemplary attack detection component 240. According to one aspect, the vulnerability testing component 250 can attempt to attack the service 131 in a manner equivalent to, or analogous to, the attacks in the log entries 241 that were received from the attack detection component 240.

For example, if one of the entries 241 was a cross site scripting attack having a specific syntax and specific alphanumeric strings, then the vulnerability testing component 250 can issue that same inbound communication, with that same syntax and those same alphanumeric strings, as an attack 251 on the service 131. The vulnerability testing component 250 can then receive results 252, from the service 131, and, based on those results 252, exemplary vulnerability testing component 250 can determine whether the attack exploited an actual vulnerability, or, conversely, whether the attack failed and the service 131 is not vulnerable to such an attack. As another example, the vulnerability testing component 250 can utilize machine learning or fuzzy logic to deviate from the exact alphanumeric strings of the log entries that were identified as attacks 241 to attempt, as part of the attacks 251, different variations of the attacks represented by the log entries 241. For example, the vulnerability testing component 250 can try different values of the same parameters identified in the log entries that were identified as attacks 241. As another example, the vulnerability testing component 250 can attempt attacks 251 that substitute equivalent functionality. For example, an injection attack from one of the log entries 241 can be attempted, as part of the attacks 251, both with identical alphanumeric strings to those of the log entry 241, and with alphanumeric strings where, for example, the single quote character is replaced by the double-dash character.

Once the exemplary vulnerability testing component 250 issues a communication inbound to the service 131 as one of the attacks 251, the vulnerability testing component 250 can receive the results 252 of such a communication. According to one aspect, the exemplary vulnerability testing component 250 can determine that an attack was successful if the results 252 evidence the execution, by the service 131, of computer-executable instructions that were inserted by the attack. According to another aspect, the exemplary vulnerability testing component 250 can determine that an attack was successful if the results 252 evidence that one or more parameters defining the operation of the service 131 were either set improperly, thereby allowing the attack to succeed, or are now set improperly due to the attack.

If the results 252 of an attack 251 evidence that the attack was successful, or evidence that the attack is likely to be successful, such as in the manner illustrated above, the vulnerability testing component 250 can identify the corresponding log entries as targeting vulnerabilities and can provide a notification 259 of such vulnerabilities. According to one aspect, an optional vulnerability amelioration component 260 can automatically undertake actions to limit the success of attacks directed to such vulnerabilities. For example, the vulnerability amelioration component 260 can change the values of predefined parameters or settings 261 that define the framework on which the service 131 executes to no longer enable attacks directed to identified vulnerabilities to succeed, or otherwise decrease or eliminate the risk posed by such attacks to the service 131.

Figure 3:
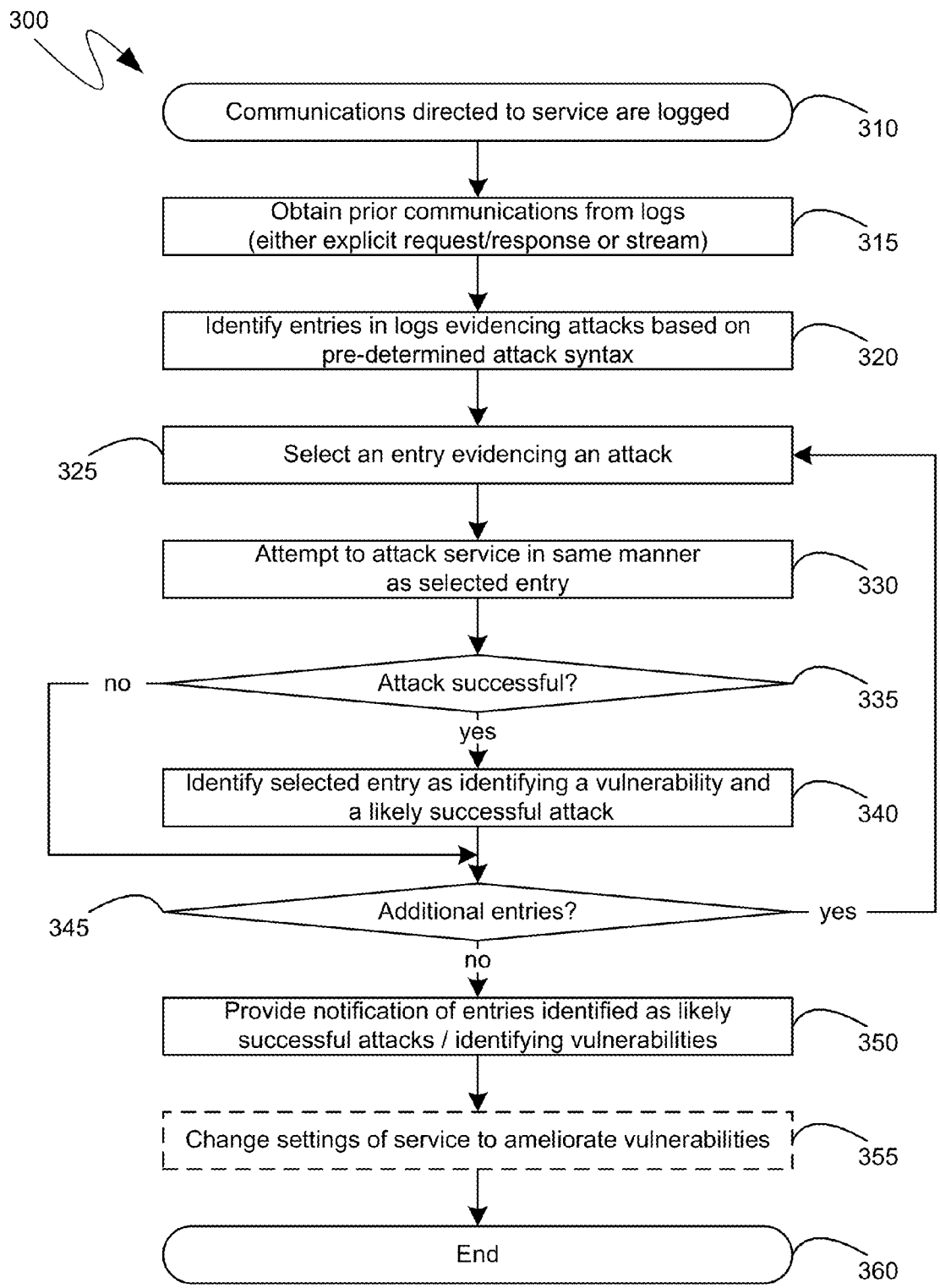
FIG. 3 is a flow diagram of an exemplary operation of a passive web application firewall.

Turning to FIG. 3, the exemplary flow diagram 300 shown therein illustrates an exemplary series of steps that can implement a passive web application firewall, such as that illustrated above. More specifically, at step 310, inbound communications directed to a service can be logged such that some or all of the inbound communicational data is retained. At step 315, previously received inbound communications can be obtained from the logs into which they were logged by step 310. As indicated previously, the obtaining, at step 315, can be in response to explicit requests for such prior communications, or can be as part of a streaming of the prior communications to the computer-executable instructions executing the steps of the exemplary flow diagram 300. Subsequently, at step 320, the logged prior communications can be scanned to identify entries in those logs that evidence an attack. As indicated previously, such scanning can be based on known signatures of previously detected attacks. Alternatively, or in addition, such scanning can be informed by attacks detected by an active web application firewall, such as that illustrated in FIG. 1, which can be utilized in conjunction with the passive web application firewall described herein. More specifically, as the active web application firewall identifies specific syntax as a new attack, such updated information can be provided and utilized as part of the scanning of the entries, at step 320, to identify those entries, corresponding to inbound communications, which are determined to be an attack.

Once log entries, corresponding to inbound communications, that are determined to be an attack are identified, at step 320, processing can proceed to steps 325 through 345, wherein those identified log entries are then evaluated to determine which of those attacks was directed to an actual vulnerability, such that the attack is likely to succeed. At step 325, one of the entries identified at step 320 can be selected. At step 330, the service can be attacked in the same manner as the entry selected at step 325. As indicated previously, the generated attacks, at step 330, can be identical to the attack of the entry selected at step 325, or they can be variants thereof, such as variants utilizing different parameter values, different key characters or symbols, and other like variations. At step 335, a determination can be made as to whether the attacks, of step 330, were successful. As indicated previously, an attack can be determined to be successful if it results in the execution of computer-executable instructions inserted by the attack, it results in, or relies upon, settings or parameter values that are improper or incorrect, or otherwise meets criteria of a successful attack. If, at step 335, it is determined that the attack was successful, then the entry selected at step 325 can be identified as part of a subset of log entries, corresponding to prior communications, that are attacks targeted at actual vulnerabilities and are, therefore, attacks that are likely to succeed. Processing can then proceed to step 345. Conversely, if, at step 335, it is determined that the attack, of step 330, was not successful, processing can directly proceed to step 345, where further determination can be made as to whether there are any additional entries from among the entries identified at step 320. If such additional entries remain, processing can return to step 325 and steps 325 through 345 can be performed again.

Subsequent to the steps 320 through 345, once no further entries, identified as attacks, remain to be evaluated for whether such attacks were likely to be successful, processing can proceed to step 350, and a notification can be generated identifying those entries, corresponding to communications that were previously directed to the service, which have been identified both as an attack, and, moreover, an attack that is likely to succeed because it is targeting a vulnerability. According to one aspect, subsequent to the provision of the notification, at step 350, the relevant processing can end at step 360. Alternatively, or in addition, an additional step 355 can be performed where settings of the platform upon which the computer-executable instructions providing the service are executing, including the settings of those computer-executable instructions themselves, can be changed to ameliorate the vulnerabilities identified at step 350. As indicated previously, such automated amelioration can be in the form of predetermined changes to settings, parameter or variable values, or other like changes. For example, the automated changes, at step 355, can change settings in accordance with known best practices to reduce security risks. As another example, the automated changes, at step 355, can change settings in accordance with predetermined conditions that can specify alternative settings if certain events or vulnerabilities are detected. Subsequently, the relevant processing can end at step 360.

Figure 4:
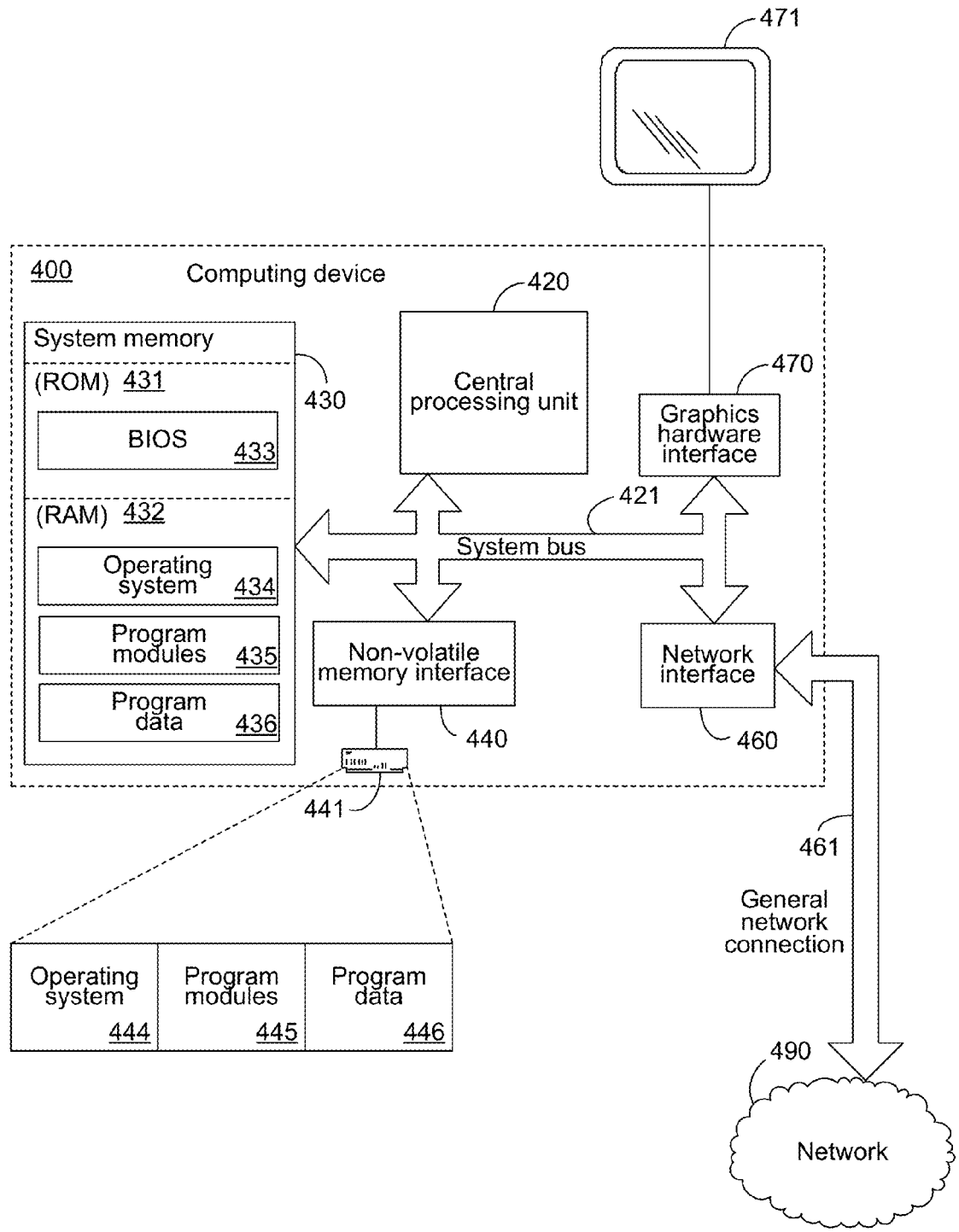
FIG. 4 is a block diagram of an exemplary computing device.

Turning to FIG. 4, an exemplary computing device 400 is illustrated which can perform some or all of the mechanisms and actions described above. The exemplary computing device 400 can include, but is not limited to, one or more central processing units (CPUs) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. The computing device 400 can optionally include graphics hardware, including, but not limited to, a graphics hardware interface 470 and a display device 471, which can include display devices capable of receiving touch-based user input, such as a touch-sensitive, or multitouch capable, display device. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 400. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer content between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 441 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 441 is typically connected to the system bus 421 through a non-volatile memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 may operate in a networked environment using logical connections to one or more remote computers. The computing device 400 is illustrated as being connected to the general network connection 461 through a network interface or adapter 460, which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 461. It will be appreciated that the network connections shown are exemplary and other means of establishing a communications link between computing devices may be used.

Although described as a single physical device, the exemplary computing device 400 can be a virtual computing device, in which case the functionality of the above-described physical components, such as the CPU 420, the system memory 430, the network interface 460, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 400 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a method of protecting delivery of computer-implemented functionality that is offered over a network, the method comprising the steps of: obtaining logs of prior communications directed to the computer-implemented functionality; identifying a set of entries, from the obtained logs, as attacks based on each entry, of the set of entries, matching a pre-determined attack syntax; attempting to attack the computer-implemented functionality using same attacks as in the set of entries; identifying a subset of entries, from the set of entries, as likely successful attacks based on results of the attempted attacking; and generating notification of only the subset of entries.

A second example is the method of the first example, wherein the pre-determined attack syntax comprises identification of parameter names and values provided as part of a Uniform Resource Locator (URL).

A third example is the method of the first example, wherein the pre-determined attack syntax is updated based on attacks detected by a web application firewall that blocks detected attacks prior to those communications being received by the computer-implemented functionality.

A fourth example is the method of the first example, wherein an entry is identified as an attack if its syntax matches a form of at least one pre-determined attack syntax, but is not identical to any of the pre-determined attack syntaxes.

A fifth example is the method of the first example, wherein the obtaining the logs comprises obtaining the prior communications directed to the computer-implemented functionality as streamed data.

A sixth example is the method of the first example, wherein the identifying the subset of entries as likely successful attacks comprises identifying a first entry as a likely successful attack because the attempting to attack the computer-implemented functionality using the same attack as in the first entry resulted in execution of computer-executable instructions inserted by the attack.

A seventh example is the method of the first example, wherein the identifying the subset of entries as likely successful attacks comprises identifying a first entry as a likely successful attack because the attempting to attack the computer-implemented functionality using the same attack as in the first entry identified incorrect settings in a framework executing the computer-implemented functionality.

An eighth example is the method of the first example, further comprising: identifying one or more settings whose current settings enable attacks, associated with the subset of entries, to succeed; and changing at least some of the identified one or more settings.

A ninth example is a computing device comprising: one or more processing units; and computer-readable media comprising computer-executable instructions, which, when executed by the one or more processing units, cause the computing device to: obtain logs of prior communications directed to the computer-implemented functionality; identify a set of entries, from the obtained logs, as attacks based on each entry, of the set of entries, matching a pre-determined attack syntax; attempt to attack the computer-implemented functionality using same attacks as in the set of entries; identify a subset of entries, from the set of entries, as likely successful attacks based on results of the attempted attacking; and generate notification of only the subset of entries.

A tenth example is the computing device of the ninth example, wherein the predetermined attack syntax is updated based on attacks detected by a web application firewall that blocks detected attacks prior to those communications being received by the computer-implemented functionality.

An eleventh example is the computing device of the ninth example, wherein an entry is identified as an attack if its syntax matches a form of at least one pre-determined attack syntax, but is not identical to any of the pre-determined attack syntaxes.

A twelfth example is the computing device of the ninth example, wherein the computer-executable instructions causing the computing device to perform the obtaining the logs comprise computer-executable instructions, which, when executed by the one or more processing units, cause the computing device to obtain the prior communications directed to the computer-implemented functionality as streamed data.

A thirteenth example is the computing device of the ninth example, wherein the computer-executable instructions causing the computing device to perform the identifying the subset of entries as likely successful attacks comprise computer-executable instructions, which, when executed by the one or more processing units, cause the computing device to identify a first entry as a likely successful attack because the attempting to attack the computer-implemented functionality using the same attack as in the first entry resulted in execution of computer-executable instructions inserted by the attack.

A fourteenth example is the computing device of the ninth example, wherein the computer-readable media comprise further computer-executable instructions, which, when executed by the one or more processing units, cause the computing device to: identify one or more settings whose current settings enable attacks, associated with the subset of entries, to succeed; and change at least some of the identified one or more settings.

A fifteenth example is a system for protecting delivery of computer-implemented functionality that is offered over a network comprising: a first set of computing devices performing steps comprising: obtaining logs of prior communications directed to the computer-implemented functionality; identifying a set of entries, from the obtained logs, as attacks based on each entry, of the set of entries, matching a pre-determined attack syntax; and a second set of computing devices performing steps comprising: attempting to attack the computer-implemented functionality using same attacks as in the set of entries; identifying a subset of entries, from the set of entries, as likely successful attacks based on results of the attempted attacking; and generating notification of only the subset of entries.

A sixteenth example is the system of the fifteenth example, wherein the first and second sets of computing devices are wholly distinct from one another.

A seventeenth example is the system of the fifteenth example, further comprising a third set of computing devices executing computer-executable instructions implementing the computer-implemented functionality.

An eighteenth example is the system of the fifteenth example, wherein an entry is identified as an attack if its syntax matches a form of at least one pre-determined attack syntax, but is not identical to any of the pre-determined attack syntaxes.

A nineteenth example is the system of the fifteenth example, wherein the identifying the subset of entries as likely successful attacks comprises identifying a first entry as a likely successful attack because the attempting to attack the computer-implemented functionality using the same attack as in the first entry resulted in execution of computer-executable instructions inserted by the attack.

A twentieth example is the system of the fifteenth example, further comprising a third set of computing devices performing steps comprising: identifying one or more settings whose current settings enable attacks, associated with the subset of entries, to succeed; and changing at least some of the identified one or more settings.

As can be seen from the above descriptions, mechanisms for increasing the protection, of services offering computer-implemented functionality, through the use of a passive web application firewall, have been presented. In view of the many possible variations of the subject matter described herein, we claim as our invention all such embodiments as may come within the scope of the following claims and equivalents thereto.

We claim:

1. A method of protecting delivery of computer-implemented functionality that is offered over a network, the method comprising the steps of:
   obtaining logs of prior communications received from the network directed to the computer-implemented functionality to perform operation services;
   identifying, from the obtained logs, a first set of log entries as attacks based on each entry, of the first set of entries, matching a pre-determined attack syntax;
   in response to the identifying the first set of log entries, testing an actual vulnerability by:
      selecting a log entry from the identified first set of log entries;
      generating an attack communication directed to the computer-implemented functionality, the generated attack communication being analogous to an attack of the selected log entry;
      detecting, from the computer-implemented functionality, either results indicative that the generated attack communication resulted in execution of computer-executable instructions inserted by the generated attack communication or results indicative that one or more parameters defining operation of the computer-implemented functionality were either set improperly or incorrectly, thereby allowing the generated attack to succeed, or are now set improperly or incorrectly due to the generated attack; and
      flagging the selected entry only if the results were indicative that the generated attack communication resulted in the successful attack;
   repeating the testing the actual vulnerability for other entries from the set of entries; and
   generating notification of only the second set of entries, which is a subset of the identified first set of log entries.

2. The method of claim 1, wherein the pre-determined attack syntax comprises identification of parameter names and values provided as part of a Uniform Resource Locator (URL).

3. The method of claim 1, wherein the pre-determined attack syntax is updated based on attacks detected by a web application firewall that blocks detected attacks prior to those communications being received by the computer-implemented functionality.

4. The method of claim 1, wherein the obtaining the logs comprises obtaining the prior communications directed to the computer-implemented functionality as streamed data.

5. The method of claim 1, further comprising:
   changing at least some of the one or more parameters defining the operation of the computer-implemented functionality.

6. The method of claim 1, wherein the generated attack communication comprises same parameters, but different values for the same parameters, as the attack of the selected log entry.

7. The method of claim 1, wherein the generating the attack communication analogous to the attack of the selected log entry comprises both:
   generating a first attack communication having parameter values identical to corresponding parameter values of the attack of the selected log entry; and
   generating one or more other attack communications having parameter values differing from the corresponding parameter values of the attack of the selected log entry.

8. A computing device comprising:
   one or more hardware processing units; and
   computer-readable media comprising computer-executable instructions, which, when executed by the one or more processing units, cause the computing device to:
      obtain logs of prior communications received from the network directed to the computer-implemented functionality to perform operation services;
      identify, from the obtained logs, a first set of log entries as attacks based on each entry, of the first set of entries, matching a pre-determined attack syntax;
      in response to the identifying the first set of loci entries, testing an actual vulnerability by:
         selecting a log entry from the identified first set of log entries;
         generating an attack communication directed to the computer-implemented functionality, the generated attack communication being analogous to an attack of the selected log entry;
         detecting, from the computer-implemented functionality, either results indicative that the generated attack communication resulted in execution of computer-executable instructions inserted by the generated attack communication or results indicative that one or more parameters defining operation of the computer-implemented functionality were either set improperly or incorrectly, thereby allowing the generated attack to succeed, or are now set improperly or incorrectly due to the generated attack; and
         flagging the selected entry only if the results were indicative that the generated attack communication resulted in the successful attack;
      repeat the testing the actual vulnerability for other entries from the set of entries; and
      generate notification of only the second set of entries, which is a subset of the identified first set of log entries.

9. The computing device of claim 8, wherein the pre-determined attack syntax is updated based on attacks detected by a web application firewall that blocks detected attacks prior to those communications being received by the computer-implemented functionality.

10. The computing device of claim 8, wherein the computer-executable instructions causing the computing device to perform the obtaining the logs comprise computer-executable instructions, which, when executed by the one or more processing units, cause the computing device to obtain the prior communications directed to the computer-implemented functionality as streamed data.

11. The computing device of claim 8, wherein the computer-readable media comprise further computer-executable instructions, which, when executed by the one or more processing units, cause the computing device to:
    change at least some of the one or more parameters defining the operation of the computer-implemented functionality.

12. The computing device of claim 8, wherein the generated attack communication comprises same parameters, but different values for the same parameters, as the attack of the selected log entry.

13. The computing device of claim 8, wherein the computer-executable instructions causing the computing device to perform the generating the attack communication analogous to the attack of the selected log entry comprise computer-executable instructions, which, when executed by the one or more processing units, cause the computing device to both:
- generate a first attack communication having parameter values identical to corresponding parameter values of the attack of the selected log entry; and
- generate one or more other attack communications having parameter values differing from the corresponding parameter values of the attack of the selected log entry.

14. A system for protecting delivery of computer-implemented functionality that is offered over a network comprising:
- a first set of computing devices performing steps comprising:
  - obtaining logs of prior communications received from the network directed to the computer-implemented functionality to perform operating services;
  - identifying, from the obtained logs, a first set of log entries as attacks based on each entry, of the first set of entries, matching a pre-determined attack syntax; and
- a second set of computing devices performing steps comprising:
  - in response to the identifying the first set of log entries, testing an actual vulnerability by:
    - selecting a log entry from the identified first set of log entries;
    - generating an attack communication directed to the computer-implemented functionality, the generated attack communication being analogous to an attack of the selected log entry;
    - detecting, from the computer-implemented functionality, either results indicative that the generated attack communication resulted in execution of computer-executable instructions inserted by the generated attack communication or results indicative that one or more parameters defining operation of the computer-implemented functionality were either set improperly or incorrectly, thereby allowing the generated attack to succeed, or are now set improperly or incorrectly due to the generated attack; and
    - flagging the selected entry only if the results were indicative that the generated attack communication resulted in the successful attack;
  - repeating the testing the actual vulnerability for other entries from the set of entries; and
  - generating notification of only the second set of entries, which is a subset of the identified first set of log entries.

15. The system of claim 14, wherein the first and second sets of computing devices are wholly distinct from one another.

16. The system of claim 14, further comprising a third set of computing devices executing computer-executable instructions implementing the computer-implemented functionality.

17. The system of claim 14, further comprising a third set of computing devices performing steps comprising:
- changing at least some of the one or more parameters defining the operation of the computer-implemented functionality.

18. The system of claim 14, wherein the obtaining the logs comprises obtaining the prior communications directed to the computer-implemented functionality as streamed data.

19. The system of claim 14, wherein the generated attack communication comprises same parameters, but different values for the same parameters, as the attack of the selected log entry.

20. The system of claim 14, wherein the generating the attack communication analogous to the attack of the selected log entry comprises both:
- generating a first attack communication having parameter values identical to corresponding parameter values of the attack of the selected log entry; and
- generating one or more other attack communications having parameter values differing from the corresponding parameter values of the attack of the selected log entry.

* * * * *